Patented Sept. 11, 1945

2,384,619

UNITED STATES PATENT OFFICE 2,384,619

SOLID SOLUTION OF VINYL AROMATIC POLYMER AND HYDROGENATED VINYL AROMATIC POLYMER

Harold P. Heller, Palmyra, N. J., assignor to Radio Corporation of America, a corporation of Delaware No Drawing. Application July 22, 1943,
Serial No. 495,769

10 Claims. (Cl. 260—42)

This invention relates to a novel composition of matter and the method of producing the same, and more particularly to a thermoplastic synthetic resin useful in the electrical arts.

There are many applications for dielectric materials in the electrical arts, as is well known. For example, dielectric materials are used extensively in capacitors and casings therefor, coil forms, coaxial cables, casings for quartz crystals, and in many other applications. Where such articles are made of synthetic resins, they are generally molded or cast out of either thermoplastic or thermosetting materials, various materials being selected for particular applications in accordance with the properties which they exhibit. Among the properties which are taken into consideration are the dielectric constant of the material, its ability to withstand high temperatures, the ease with which it lends itself to molding or casting, its power factor, its resistance to deformation at relatively high temperatures, etc. These properties are possessed more or less in varying degrees by different materials which have been made available heretofore, but so far as I am aware, there is no one material which possesses all of the above characteristics to a degree which renders it more or less universally useful in the electrical arts.

The primary object of my present invention is to provide a novel composition of matter which possesses such electrical and physical characteristics as to be useful in the electrical arts in a wide variety of applications, together with the method of forming the same.

More particularly, it is an object of my present invention to provide an improved composition of matter which is particularly useful in the electrical arts because of its dielectric qualities.

Another object of my present invention is to provide an improved composition of matter as aforesaid which will withstand physical deformation at relatively high temperatures.

Still another object of my present invention is to provide an improved composition of matter as above set forth which possesses a very low power factor and which has a high dielectric constant.

A further object of my invention is to provide an improved composition of matter which can be readily cast, molded, machined, and subjected to other similar mechanical treatments.

It is also an object of my present invention to provide an improved composition of matter as above set forth which can be readily manufactured, which is highly efficient in use, and which compares very favorably in cost with similar materials heretofore available.

In accordance with my present invention, I form a solid solution of an aromatic poly-olefin and a hydrogenated aromatic poly-olefin. Preferably, but not necessarily, the aromatic poly-olefin may be constituted by a poly-vinyl compound such as polystyrene or other similar polyvinyl aryl compounds, such as para-methyl polystyrene, polyvinyl naphthalene, polydivinyl benzene, or the like, and the hydrogenated aromatic poly-olefin may be constituted by hydrogenated polystyrene which may or may not be wholly polyvinyl cyclohexane, depending upon the degree of hydrogenation. In forming the solid solution, various proportions of monomeric vinyl benzene and hydrogenated polystyrene are mixed together until the latter is entirely dissolved in the former to form a colloidal solution. The solution may then be either vacuum treated or permitted to stand for a suitable period of time exposed to the atmosphere or to an inert gas to remove any bubbles that may be entrapped therein, after which the solution is subjected to heat to effect polymerization of the monomeric vinyl benzene. During the heating process, the monomeric vinyl benzene becomes polymerized and the hydrogenated polystyrene precipitates out to form a solid solution of polystyrene and hydrogenated polystyrene, the chains of the polyvinyl benzene or polystyrene being intimately interlocked with the chains of the hydrogenated polystyrene. The reaction is preferably carried out at atmospheric pressure at a temperature and for a period of time sufficient to effect more or less complete polymerization of the monomeric styrene. A suitable catalyst, such as oxygen, benzoyl peroxide or the like, may or may not be used, as is found most desirable.

In general, it may be stated that the reaction should be carried out at a rate such that relatively long chains of polystyrene will be produced, the longer the chains, the higher the resistance to physical deformation at elevated temperatures. Practical considerations necessitate a reaction time which is relatively short. I have found that if the reaction is carried out at temperatures of from about 100° C. to about 140° C. and for a period of time from about 3 days to about 10 days, economically optimum results will be obtained.

The hydrogenated polystyrene is preferably one in which at least 40 per cent of the available double bonds have been saturated with hydrogen, and of which the molecular weight is of the order of 30,000 or higher. I have also found it desirable to carry forth the reaction in such manner that the polystyrene component also has a molecular weight of at least 30,000 or higher. The amount of hydrogenated polystyrene to be used may be as low as 2 per cent and as high as 150 per cent by weight of the monomeric styrene, depending upon the characteristics of the finished material which are desired, although about 30 per cent to 60 per cent of hydrogenated polystyrene by weight has been found most suitable.

Experimental results have shown that a wide range of polymers may be produced in accordance with my present invention. In one case, for example, 20 grams of hydrogenated polystyrene having a molecular weight of approximately 30,000 and in which approximately 50 per cent hydrogenation was effected were dissolved in 40 cc. (approximately 38 grams) of monomeric styrene. The resulting colloidal solution was allowed to remain at room temperature (about 28° C.) for approximately 18 hours to permit the air bubbles to escape. The solution was then placed in an oven maintained at 130° C. for 72 hours. The resulting material was found to have a power factor of the order of .0005 at a frequency of one megacycle per second, a dielectric constant of the order of 2.4, and a volume resistivity of the order of $10^{17}$ ohm centimeters per centimeter cube. This material was found to suffer no elongation at temperatures of from about 85° C. to over 105° C. when subjected to uniform tensile loads of the order of 9 lbs. per square inch. Not until substantially 110° C. was reached was any appreciable physical deformation observed under this load, and then only about 1 per cent elongation. In appearance the material was marble white, could readily be machined, drilled, cut with a saw, and otherwise successfully treated mechanically, and was also readily moldable by injection molding processes. The resulting molded product had a sheen similar to that of mother of pearl. It was also found that the material could be initially cast in desired forms during the heating or polymerizing process by placing the solution in molds of appropriate shapes and treating it as above described.

Although I have described my invention in considerable detail, it will, no doubt, be readily apparent to those skilled in the art that various modifications thereof, as well as variations in the precise manner of producing the material, are possible. It may be pointed out that the monomeric styrene should preferably be one which has had an opportunity to become slightly polymerized at room temperature for a period of the order of approximately 3 to 10 days, rather than being freshly distilled. Also, while the particular hydrogenated polystyerene used in the specific illustration set forth above was one in which approximately 50 per cent of the available double bonds were saturated with hydrogen, it is obvious that the degree of saturation may be varied as the circumstances require. Moreover, if desired, the heat treatment may be carried out at pressures other than atmospheric presure, in which case the operating temperatures and times would vary correspondingly. Also, the heat treatment may be carried out in the presence of an inert gas instead of in the presence of air. Other similar variations are also possible within the scope of my invention. It will also be apparent, no doubt, that although I have described my invention particularly with reference to the electrical arts, its usefulness is by no means limited thereto and that it has many other fields of use, as for example, wherever thermoplastic, molded materials are used advantageously. I therefore desire that my invention shall not be limited except insofar as is made necessary by the prior art and by the spirit of the appended claims.

I claim as my invention:

1. A composition of matter comprising a solid solution of a resinuous polymer of a vinyl aromatic compound and a hydrogenated resinous polymer of a vinyl aromatic compound.

2. A composition of matter comprising a solid solution of polystyrene and hydrogenated polystyrene.

3. A composition of matter as set forth in claim 2 wherein both the polystyrene and the hydrogenated polystyrene have molecular weights of the order of at least 30,000.

4. A composition of matter as set forth in claim 2 wherein the hydrogenated polystyrene is constituted by polystyrene in which at least 40 per cent of the available double bonds have been saturated with hydrogen.

5. The method of forming a solid solution of polystyrene and hydrogenated polystyrene which comprises dissolving the hydrogenated polystyrene in monomeric styrene and then polymerizing the monomeric styrene.

6. The method of forming a solid solution of polystyrene and hydrogenated polystyrene which comprises dissolving between about 30 per cent and 60 per cent of hydrogenated polystyrene by weight in monomeric styrene, and then polymerizing the monomeric styrene.

7. The method of forming a solid solution of polystyrene and hydrogenated polystyrene which comprises dissolving the hydrogenated polystyrene in monomeric styrene, and then subjecting the resulting solution to a temperature sufficient to effect polymerization of the monomeric styrene in from approximately 3 to 10 days.

8. The method of forming a solid solution of polystyrene and hydrogenated polystyrene which comprises dissolving the hydrogenated polystyrene in monomeric styrene, and then subjecting the resulting solution to a temperature of from about 100° C. to 135° C.

9. The method set forth in claim 5 wherein the hydrogenated polystyrene is constituted by polystyrene in which at least 40 per cent of the available double bonds have been saturated with hydrogen.

10. The method set forth in claim 5 wherein polymerization of the monomeric styrene is effected in such a manner that the resulting polystyrene has a molecular weight of the order of 30,000 or higher and wherein the hydrogenated polystyrene also has a molecular weight of the order of 30,000 or higher.

HAROLD P. HELLER.